(12) United States Patent
Guzda et al.

(10) Patent No.: US 8,052,007 B2
(45) Date of Patent: Nov. 8, 2011

(54) CONTAINER WITH INTEGRATED COOLANT SEALS

(75) Inventors: Jeffrey M. Guzda, Spencerport, NY (US); Mark W. Keyser, Bloomfield, NY (US); Timothy William Rowe, Churchville, NY (US); Steven J. Spencer, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 973 days.

(21) Appl. No.: 11/972,360

(22) Filed: Jan. 10, 2008

(65) Prior Publication Data

US 2009/0178612 A1 Jul. 16, 2009

(51) Int. Cl.
*B65D 25/04* (2006.01)
*B65D 85/48* (2006.01)

(52) U.S. Cl. ........ 220/529; 220/535; 220/538; 206/451; 206/454

(58) Field of Classification Search .................. 220/529, 220/534, 538, 535, 4.03, 559; 206/451, 454; 118/500, 503
See application file for complete search history.

(56) References Cited

U.S. PATENT DOCUMENTS

| | | | | | |
|---|---|---|---|---|---|
| 2,877,773 | A | * | 3/1959 | Sewell | 220/538 |
| 4,072,230 | A | * | 2/1978 | Mulligan | 206/722 |
| 5,641,076 | A | * | 6/1997 | Englund | 211/41.14 |
| 6,036,031 | A | * | 3/2000 | Ishikawa | 211/41.18 |
| 6,302,271 | B1 | * | 10/2001 | Grant | 206/423 |
| 2007/0231744 | A1 | * | 10/2007 | Sasao et al. | 430/281.1 |
| 2008/0164173 | A1 | * | 7/2008 | Savakus | 206/454 |

\* cited by examiner

*Primary Examiner* — Anthony Stashick
*Assistant Examiner* — Niki Eloshway
(74) *Attorney, Agent, or Firm* — Fraser Clemens Martin & Miller LLC; J. Douglas Miller

(57) ABSTRACT

A container is disclosed including a plurality of seal blocks adapted to militate against the entry of a fluid into coolant channel headers formed in bipolar plates during a dip coating process, wherein the seal blocks are interconnected and include a fastening portion and a sealing portion, the sealing portion capable of being interchanged.

18 Claims, 5 Drawing Sheets

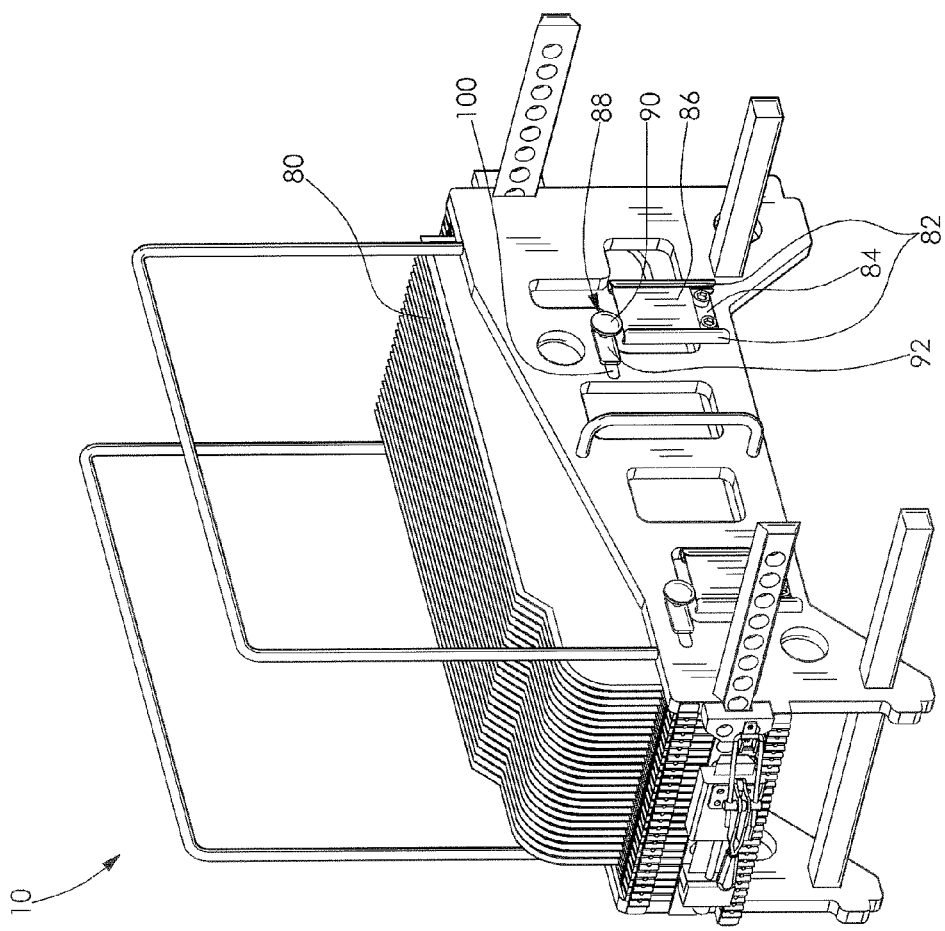
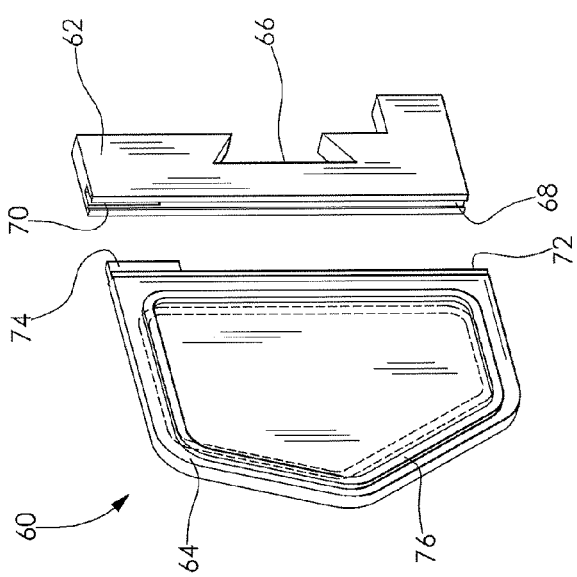
FIG. 3
FIG. 2

CONTAINER WITH INTEGRATED COOLANT SEALS

FIELD OF THE INVENTION

The invention relates to a container for holding and transporting parts through a dip coating process. More particularly, the invention is directed to a container having integrated coolant channel seals to militate against the entry of a fluid into the coolant channels of a fuel cell plate assembly during the dip coating process.

BACKGROUND SUMMARY

Fuel cell systems are increasingly being used as a power source in a wide variety of applications. Fuel cell systems have been proposed for use in power consumers, such as vehicles, as a replacement for internal combustion engines, for example. Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by the fuel cell system is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode, as well as provide mechanical support for the MEA. The DM's and MEA's are pressed between a pair of electronically conductive plates which serve as secondary current collectors for collecting the current from the primary current collectors. The plates conduct current between adjacent cells internally of the stack in the case of bipolar plates and conduct current externally of the stack (in the case of monopolar plates at the end of the stack).

The bipolar plates typically include two thin, facing metal sheets. One of the sheets defines a flow path on one outer surface thereof for delivery of the fuel to the anode of the MEA. An outer surface of the other sheet defines a flow path for the oxidant for delivery to the cathode side of the MEA. When the metal sheets are joined, the joined surfaces define a flow path for a cooling fluid. The plates are typically produced from a formable metal that provides suitable strength, electrical conductivity, and corrosion resistance, such as 316L alloy stainless steel, for example.

The bipolar plates may include at least one coating applied to the exterior. Typically, the at least one coating is applied using a dipping process. During the dipping process, the bipolar plates are submerged in at least one tank of fluid. Any amount of fluid that enters the coolant channels significantly affects the contact resistance and the uniformity of the current distribution throughout the active area of the bipolar plate, rendering the bipolar plate substantially unsuitable for stack builds. Therefore, the coolant channels of the bipolar plates are sealed during the dipping process. Generally, the fluid is prevented from entering the coolant channels by manually securing metal seal blocks over the coolant channel headers using a plurality of fasteners.

Such seal blocks require the use of additional equipment and tools to seal the coolant channels from the fluid. The additional equipment is excessively heavy and easily susceptible to improper installation.

It would be desirable to produce a container having integrated coolant seals for militating against entry of a fluid into internal coolant channels of bipolar plates during a dip coating process, wherein the container is economical to produce and the complexity of production and use thereof is minimized.

SUMMARY OF THE INVENTION

According to the present invention, a container having integrated coolant seals for militating against entry of a fluid into internal coolant channels of bipolar plates during a dip coating process, wherein the container is economical to produce and the complexity of production and use thereof is minimized, has surprisingly been discovered.

In one embodiment, the container system comprises a first plate; a second plate spaced from the first plate and movable in respect of the first plate; at least one rail extending between the first plate and the second plate, the rail having a plurality of seal blocks disposed thereon; and at least one band adapted to interconnect the first plate, the second plate, and the seal blocks.

In another embodiment, the container comprises a first outer plate; a second outer plate spaced from the first plate; at least one rail extending between the first outer plate and the second outer plate, the rail having a plurality of seal blocks disposed thereon; a first inner plate disposed on the rail; a second inner plate spaced from the first inner plate and linearly movable in respect to the first inner plate, wherein the first inner plate and the second inner plate are disposed on the rail intermediate the first outer plate and the second outer plate, and wherein the seal blocks are disposed on the rail intermediate the first inner plate and the second inner plate; and a band adapted to interconnect the first inner plate, the second inner plate, the first outer plate, and the seal blocks.

In another embodiment, the container for a dip coating process comprises a first plate having a plurality of apertures formed therein; a second plate spaced from the first plate and linearly movable in respect to the first plate, the second plate having a plurality of apertures formed therein; at least one rail extending between the first plate and the second plate, the rail having a plurality of apertures formed therein and a plurality of seal blocks disposed thereon, wherein each of the seal blocks includes a fastening portion adapted to be received on the rail and a sealing portion adapted to be removeably attached to the fastening portion, the sealing portion including at least one seal disposed thereon; a band adapted to interconnect the first plate, the second plate, and the seal blocks; and a clamp to militate against movement of the second plate relative to the first plate.

DESCRIPTION OF THE DRAWINGS

The above features of the invention will become readily apparent to those skilled in the art from reading the following detailed description of the invention when considered in the light of the accompanying drawings, in which:

FIG. 2 is an enlarged, exploded perspective view of a seal block according to an embodiment of the present invention;

FIG. 3 is a perspective view of the container illustrated in FIG. 1, wherein the container is loaded and in the closed position;

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
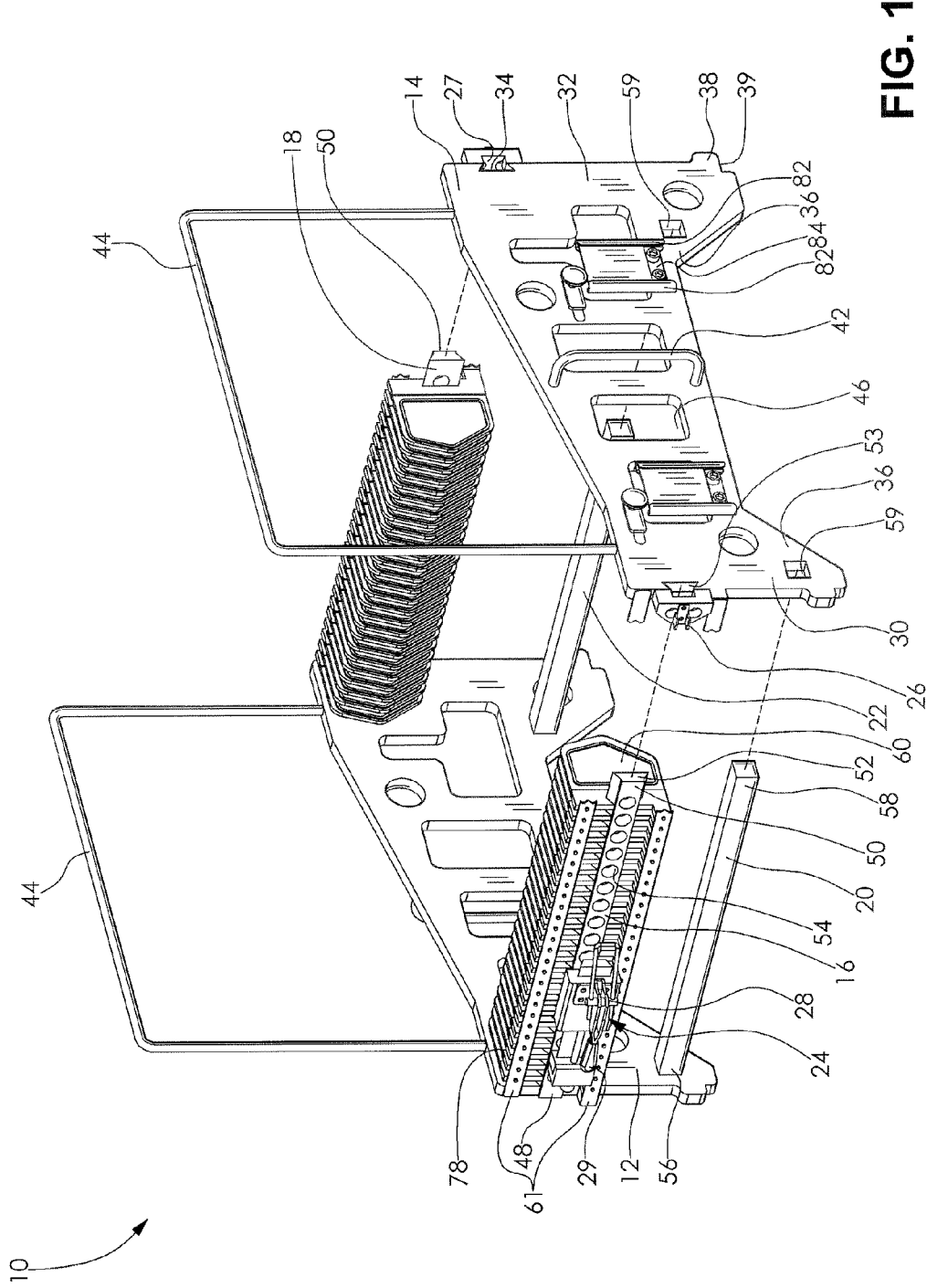
FIG. 1 is a partially exploded perspective view of a container according to an embodiment of the present invention, wherein the container is empty and in an open position.

FIG. 1 shows a container 10 according to an embodiment of the invention. The container 10 includes a first plate 12 and a spaced apart second plate 14. A first guide rail 16 and a spaced apart second guide rail 18 are disposed between the first plate 12 and the second plate 14. A first support rail 20 and a spaced apart second support rail 22 also extend between the first plate 12 and the second plate 14. At least one clamp 24 adapted to militate against movement of the second plate 14 relative to the first plate 12 is disposed on the container 10. In the embodiment shown, the clamp 24 is a toggle clamp including a hook portion 26 having a slot 27 formed therein and a latch portion 28 provided with a lever 29 thereon. The hook portion 26 is affixed to the second plate 14 and the latch portion 28 is affixed to one of the guide rails 16, 18, by at least one fastener such as a screw, a bolt, and the like, for example. It is understood that other clamp types can be employed and affixed elsewhere on the container 10, as desired.

The plates 12, 14 are generally rectangular in shape, each having a first end 30 and a second end 32. The ends 30, 32 may include a slot 34 formed in an outer edge thereof and a leg portion 36 extending downwardly therefrom. The slot 34 is adapted to receive one of the guide rails 16, 18 therein. The leg portion 36 includes a protuberance 38 extending laterally outwardly therefrom to form a ledge 39. The ledge 39 is adapted to seat on a lip 40 of a tank 41, shown in FIG. 4. The tank 41 is adapted to hold a fluid (not shown) such as a cleansing fluid, a rinsing fluid, and a coating fluid, for example, therein. The plates 12, 14 may include a handle 42 disposed on an outer surface thereof, a handle 44 disposed on an upper surface thereof, and a plurality of apertures 46 formed therein to reduce a mass of the container 10 and allow the fluid to flow therethrough. Any conventional material may be used to produce the plates 12, 14 such as a plastic and a metal, for example, which is compatible with the fluid.

The guide rails 16, 18 have a first end 48 and a second end 50. A tenon 52 is formed on the guide rails 16, 18 and extends laterally outwardly from an upper surface and a lower surface of the guide rails 16, 18. The tenon 52 extends from the first end 48 to the second end 50 of the guide rails 16, 18 substantially parallel to a longitudinal axis thereof. In the embodiment shown, the first end 48 of each of the guide rails 16, 18 is disposed in respective slots 34 of the ends 30, 32 of the first plate 12 and affixed therein. Apertures 53 are formed by the mating of the slots 27 of the hook portion 26 of the clamp 24 and the slots 34 of the second plate 14. The second end 50 of each of the guide rails 16, 18 is slideably disposed in respective apertures 53 of the ends 30, 32 of the second plate 14. The guide rails 16, 18 may include a plurality of apertures 54 formed therein to reduce the mass of the container 10 and allow the flow of the fluid therethrough.

The support rails 20, 22 include a first end 56 and a second end 58. Apertures 59 adapted to receive the second end 58 of the support rails 20, 22 are formed in the ends 30, 32 of the second plate 14. Additional apertures 59 adapted to receive the first end 56 of the support rails 20, 22 are formed in the ends 30, 32 of the first plate 12. The first end 56 of each of the support rails 20, 22 is disposed in respective apertures 59 of the ends 30, 32 of the first plate 12 and affixed therein. The second end 58 of each the support rails 20, 22 is slideably disposed in respective apertures 59 of the ends 30, 32 of the second plate 14.

A plurality of spaced apart seal blocks 60, as shown in FIG. 2, is disposed on the guide rails 16, 18. The seal blocks 60 and the plates 12, 14 are interconnected by at least one band 61. The band 61 is adapted to cause the seal blocks 60 to separate when the container 10 is returned to an open position. The band 61 is produced from a flexible material such as polyethylene terephthalate (PET), for example. In the embodiment shown, the band 61 is affixed to the seal blocks 60 and the plates 12, 14 by a plurality of fasteners. It is understood that the band 61 can be affixed by any conventional method such as gluing and the like, for example.

As clearly illustrated in FIG. 2, each seal block 60 includes a fastening portion 62 and a sealing portion 64. The fastening portion 62, adapted to facilitate an interchange of the sealing portion 64, is slideably disposed on one of the guide rails 16, 18. It is understood that the fastening portion 62 and the sealing portion 64 can be joined by any conventional method, or the seal block 60 can be formed as a unitary piece, if desired. A first elongate mortise 66 is formed in an edge of the fastening portion 62. The mortise 66 is adapted to receive the tenon 52 of the guide rails 16, 18 therein. An interlocking joint is created by the mating of the tenon 52 and the first mortise 66. A second mortise 68 formed in another edge of the fastening portion 62 extends substantially parallel to a vertical axis thereof. The second mortise 68 includes an upper portion having a cavity 70 formed therein.

The sealing portion 64 is generally rectangular in shape and includes a tenon 72 formed on an edge thereof. The tenon 72 extends substantially parallel to a vertical axis of the sealing portion 64 and is adapted to be received in the mortise 68 of the fastening portion 62. An interlocking joint is created by the mating of the mortise 68 and the tenon 72. A tab 74 extends laterally outwardly from the tenon 72 and is adapted to be received in the cavity 70 of the fastening portion 62. The tab 74 is formed to facilitate an alignment of the fastening portion 62 with the sealing portion 64 and a retention therewith. In the embodiment shown, a seal 76 (also illustrated by phantom lines) is disposed on a periphery of at least one of a first face and a second face of the sealing portion 64 of the seal blocks 60. The seal 76 may be produced from any conventional material such as rubber, for example. In the embodiment shown, the seal blocks 60 are produced from polytetrafluoroethylene (PTFE) to facilitate slideable contact with the guide rails 16, 18 and militate against an accumulation of the fluid. When the container 10 is in the open position as shown in FIG. 1, an opening 78 is formed between each of the adjacent seal blocks 60. The opening 78 is adapted to receive a bipolar plate 80 therein, as illustrated in FIG. 3. The bipolar plate 80 includes at least one coolant channel header (not shown) formed therein.

The container 10 may include at least one pair of spaced apart arms 82 having a cross-member 84 extending therebetween. In the embodiment shown, the cross-member 84 is secured to the container 10 by a plurality of fasteners such as screws, bolts, and the like, for example. The arms 82 having a generally U-shaped cross-section, are adapted to receive a coupon 86 therein. The coupon 86 is adapted for testing at least one of an adherence of the fluid to the bipolar plate 80 and a formulation thereof. The coupon 86 is disposed in the arms 82 of the container 10 to span at least one of the apertures 46 formed in the plates 12, 14 to facilitate surface contact with the fluid. A closure 88 is adapted to removeably secure the coupon 86 in the arms 82. In the embodiment shown, the closure 88 includes a knob 90 affixed to an end portion 92 slideably disposed in an elongate aperture 100.

Figure 4:
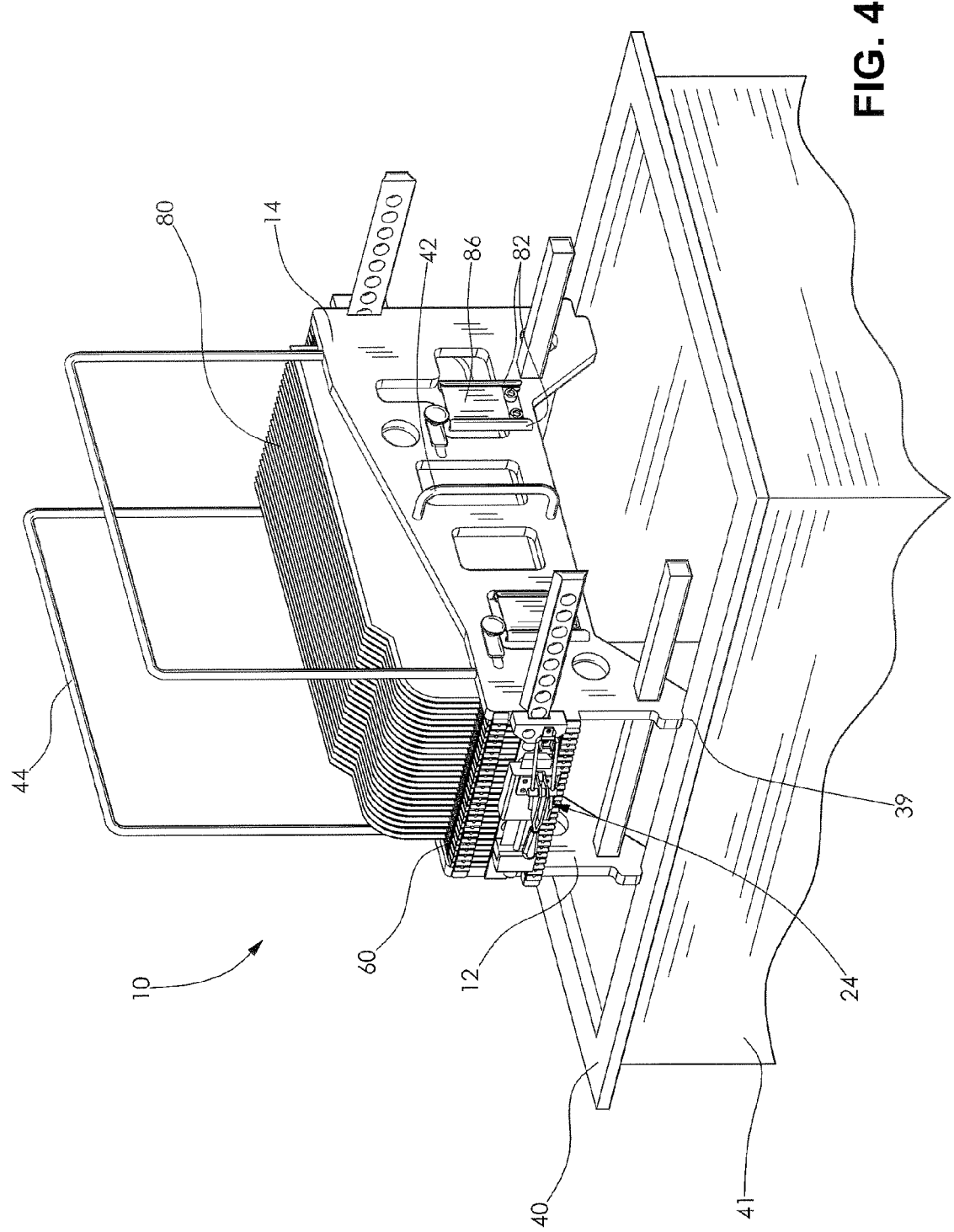
FIG. 4 is a perspective view of the container illustrated in FIGS. 1 and 3 during the drying stage of a coating process, wherein the container is loaded and in a closed position.

In operation, the coupon 86 is inserted into the arms 82 and secured therein by the closure 88. The bipolar plates 80 are then disposed in the openings 78 of the container 10 with a bottom edge in slideable contact with the support rails 20, 22. Thereafter, the second plate 14 of the container 10 with the hook portion 26 of the clamp 24 disposed thereon is caused to slide along the guide rails 16, 18 in a direction towards the first plate 12, thereby causing the seal 76 of each of the seal blocks 60 to contact a surface of the bipolar plates 80 surrounding the coolant channel header of each of the bipolar plates 80. The latch portion 28 of the clamp 24 is positioned on the hook portion 26 of the clamp 24. The lever 29 of clamp 24 is then actuated to urge the second plate 14 towards the first plate 12 and move the container 10 to a closed position, as shown in FIG. 4. The actuation of clamp 24 compresses the bipolar plates 80 between the seal blocks 60 to form a substantially fluid-tight seal therebetween.

Using the handle 44 disposed on the plates 12, 14, the container 10 including the bipolar plates 80 is lifted and disposed in the tank 41 of fluid. Thereafter, as illustrated in FIG. 4, the container 10 is removed from the tank 41 and the ledge 39 is seated on the lip 40 of the tank 41. Excess fluid is caused to drain by gravity and drip from the container 10 and the bipolar plates 80 into the tank 41. Any remaining fluid on the bipolar plates 80 is allowed to dry. It is understood that the container 10 can be disposed in additional tanks of other fluids during the dip coating process as desired. Once the fluid has dried, the clamp 24 is released. The second plate 14 is caused to move in an opposite direction away from the first plate 12, permitting the bipolar plates 80 and the seal blocks 60 to separate, and return the container 10 to the open position. The handle 42 disposed on the plates 12, 14 of the container 10 may be used to assist in opening the container 10, if desired. The bipolar plates 80 are removed from the container 10 and the coupon 86 is removed from the arms 82.

Figure 5:
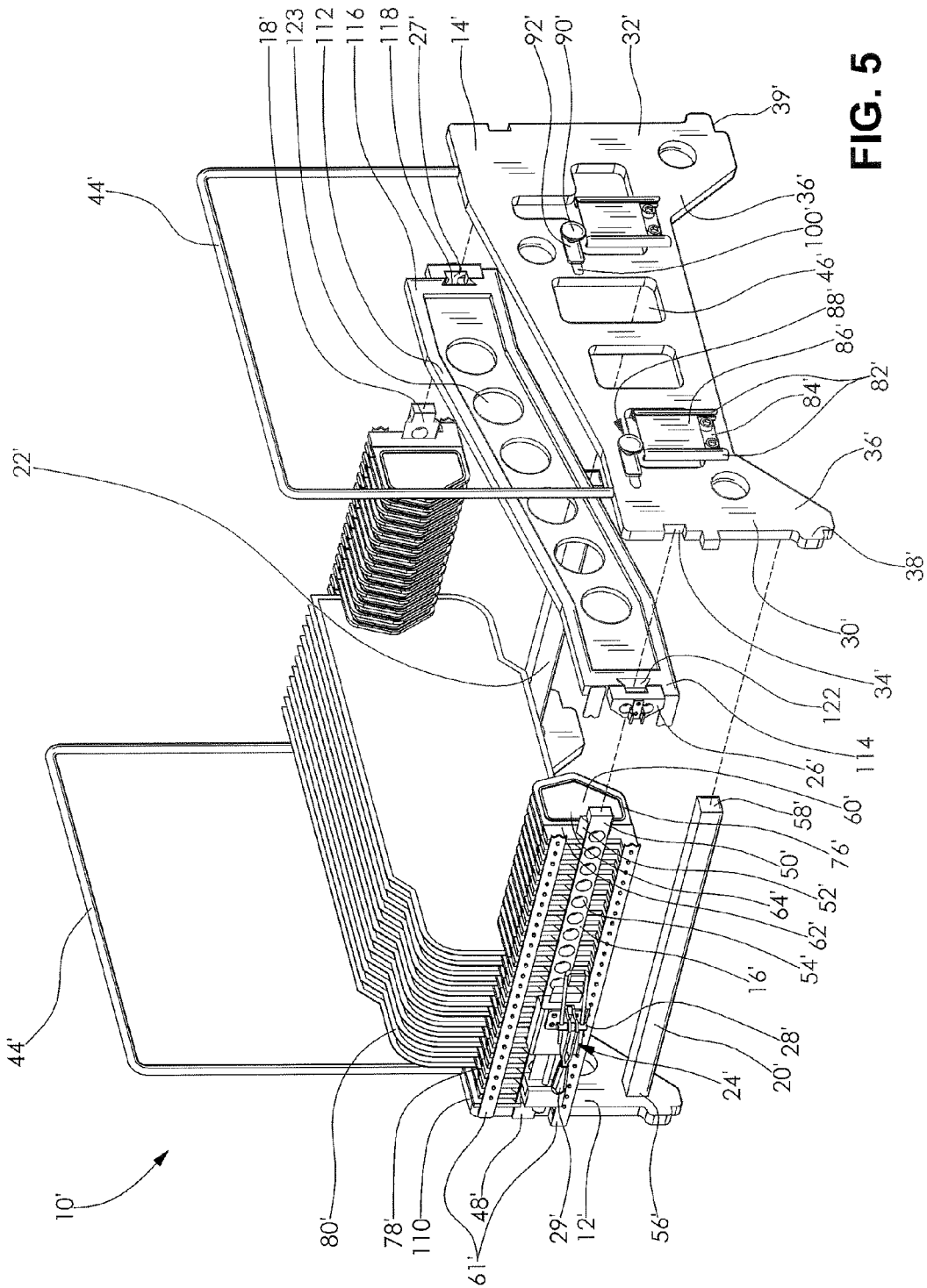
FIG. 5 is a partially exploded perspective view of a container according to another embodiment of the invention, wherein the container is partially loaded and in an open position.
Figure 6:
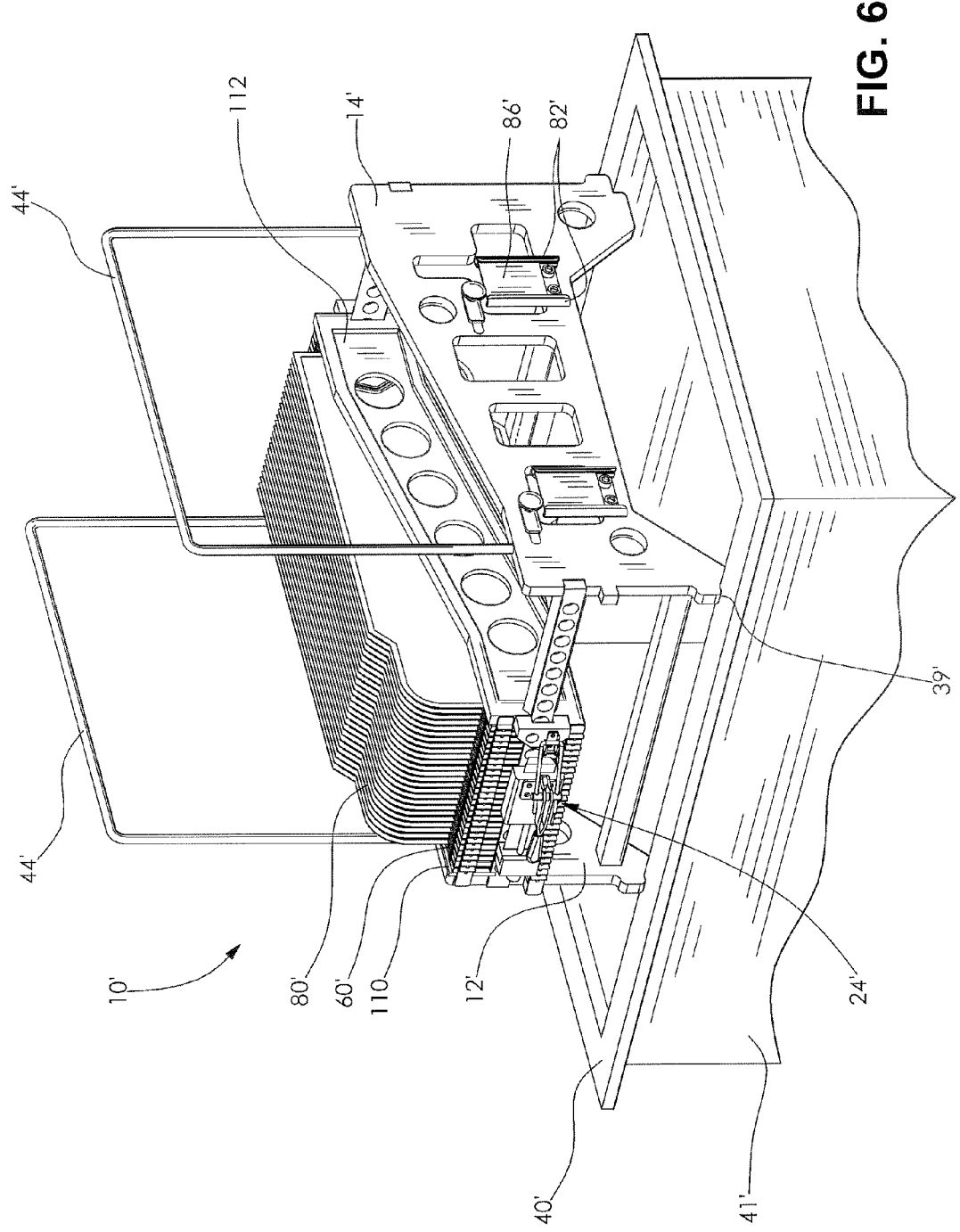
FIG. 6 is a perspective view of the container illustrated in FIG. 5, during the drying stage of a coating process, wherein the container is loaded and in the closed position.

FIGS. 5 and 6 show another embodiment of the invention which includes a container similar to that shown in FIGS. 1, 3, and 4. Reference numerals for similar structure in respect of the description of FIGS. 1, 2, 3, and 4 are repeated in FIGS. 5 and 6 with a prime (') symbol.

FIG. 5 shows a container 10'. The container 10' includes a first outer plate 12' and a spaced apart second outer plate 14'. A first guide rail 16' and a spaced apart second guide rail 18' are disposed between the first plate 12' and the second plate 14'. A first support rail 20' and a spaced apart second support rail 22' also extend between the first plate 12' and the second plate 14'. The container 10' also includes a first inner plate 110 and a spaced apart second inner plate 112 disposed on the guide rails 16', 18'. At least one clamp 24', adapted to militate against movement of the second inner plate 112 relative to the first inner plate 110, is disposed on the container 10'. In the embodiment shown, the clamp 24' is a toggle clamp including a hook portion 26' having a slot 27' formed therein and a latch portion 28' provided with a lever 29' thereon. It is understood that other clamps types can be employed and affixed elsewhere on the container 10', as desired.

The outer plates 12', 14' are generally rectangular in shape, each having a first end 30' and a second end 32'. The ends 30', 32' may include a slot 34' formed in an outer edge thereof and a leg portion 36' extending downwardly therefrom. The slot 34' is adapted to receive one of the guide rails 16', 18' therein. The leg portion 36' includes a protuberance 38' extending laterally outwardly therefrom to form a ledge 39'. The ledge 39' is adapted to seat on a lip 40' of a tank 41', shown in FIG. 6. The tank 41' is adapted to hold a fluid (not shown) such as a cleansing fluid, a rinsing fluid, and a coating fluid, for example, therein. The outer plates 12', 14' may include a handle 44' disposed on an upper surface thereof and a plurality of apertures 46' formed therein to reduce a mass of the container 10' and allow the fluid to flow therethrough. Any conventional material may be used to produce the outer plates 12', 14' such as a plastic and a metal, for example, which is compatible with the fluid.

The guide rails 16', 18' have a first end 48' and a second end 50'. A tenon 52' is formed on the guide rails 16', 18' and extends laterally outwardly from an upper surface and a lower surface of the guide rails 16', 18'. The tenon 52' extends from the first end 48' to the second end 50' of the guide rails 16', 18' substantially parallel to the longitudinal axis thereof. In the embodiment shown, the ends 48', 50' of each of the guide rails 16', 18' are disposed in respective slots 34' of the ends 30', 32' of each of the outer plates 12', 14' and affixed therein. The guide rails 16', 18' may include a plurality of apertures 54' formed therein to reduce the mass of the container 10' and allow the flow of the fluid therethrough.

The support rails 20', 22' include a first end 56' and a second end 58'. Apertures (not shown), adapted to receive the first end 56' of the support rails 20', 22', are formed in the ends 30', 32' of the outer plate 12'. Additional apertures, adapted to receive the second end 58' of the support rails 20', 22', are formed in the ends 30', 32' of the outer plate 14'. In the embodiment shown, the ends 56', 58' of each of the support rails 20', 22' are disposed in respective apertures of the ends 30', 32' of each of the outer plates 12', 14' and affixed therein.

The inner plates 110, 112 are generally rectangular in shape, each having a first end 114 and a second end 116. The ends 114, 116 may include a slot 118 formed in an outer edge thereof. In the embodiment shown, each slot 118 of the first inner plate 110 cooperates with an indentation (not shown) formed in the first end 48' of each of the guide rails 16', 18' to secure the first inner plate 110 thereto. Apertures 122 are formed by the mating of the slots 27' of the hook portion 26' of the clamp 24' and the slots 118 of the second inner plate 112. The second end 50' of each of the guide rails 16', 18' is slideably disposed in the aperture 122. The inner plates 110, 112 may include a plurality of apertures 123 formed therein to reduce the mass of the container 10' and allow the flow of the fluid therethrough. Any conventional material may be used to produce the inner plates 110, 112 such as a plastic and a metal, for example, which is compatible with the fluid.

A plurality of spaced apart seal blocks 60' is disposed on the guide rails 16', 18' intermediate the inner plates 110, 112. The seal blocks 60', the inner plates 110, 112, and the outer plate 12' are interconnected by at least one band 61'. The band 61' is adapted to cause the seal blocks 60' to separate when the container 10' is returned to an open position. The band 61' is produced from a flexible material such as polyethylene terephthalate (PET), for example. In the embodiment shown, the band 61' is affixed to the seal blocks 60' and the plates 110, 112, 12' by a plurality of fasteners. It is understood that the band 61' can be affixed by any conventional method such as gluing and the like, for example.

Each seal block 60' includes a fastening portion 62' and a sealing portion 64'. The fastening portion 62', adapted to facilitate an interchange of the sealing portion 64', is slideably disposed on one of the guide rails 16', 18'. An elongate mortise (not shown) is formed in an edge of the fastening portion 62'. The mortise is adapted to receive the tenon 52' of the guide rails 16', 18' therein. An interlocking joint is created by the mating of the tenon 52' and the mortise.

In the embodiment shown, the sealing portion 64' is generally rectangular in shape and includes a seal 76' disposed on a periphery of at least one of a first face and a second face thereof. The seal 76' may be produced from any conventional material such as rubber, for example. In the embodiment shown, the seal blocks 60' are produced from polytretrafluoroethylene (PTFE) to facilitate slideable contact with the guide rails 16', 18' and militate against an accumulation of the fluid. When the container 10' is in the open position, an opening 78' is formed between each of the adjacent seal blocks 60'. The opening 78' is adapted to receive a bipolar plate 80' therein. The bipolar plate 80' includes at least one coolant channel header (not shown) formed therein.

The container 10' may include at least one pair of spaced apart arms 82' having a cross-member 84' extending therebetween. In the embodiment shown, the cross-member 84' is secured to the container 10' by a plurality of fasteners such as screws, bolts, and the like, for example. The arms 82' having a generally U-shaped cross-section, are adapted to receive a coupon 86' therein. The coupon 86' is adapted for testing at least one of an adherence of the fluid to the bipolar plates 80' and a formulation thereof. The coupon 86' is disposed in the arms 82' of the container 10' to span at least one of the apertures 46' formed in the inner plates 12', 14' to facilitate surface contact with the fluid. A closure 88' is adapted to removeably secure the coupon 86' in the arms 82'. In the embodiment shown, the closure 88' includes a knob 90' affixed to an end portion 92' slideably disposed in an elongate aperture 100'.

In operation, the coupon 86' is inserted into the arms 82' and secured therein by the closure 88'. Bipolar plates 80' are disposed in the openings 78' of the container 10' with a bottom edge in slideable contact with the support rails 20', 22'. Thereafter, the second inner plate 112 of the container 10' with the hook portion 26' of the clamp 24' disposed thereon is caused to slide along the guide rails 16', 18' in a direction towards the first inner plate 110, thereby causing the seal 76' of each of the seal blocks 60' to contact a surface of the bipolar plates 80' surrounding the coolant channel header of each of the bipolar plates 80'. The latch portion 28' of the clamp 24' is positioned on the hook portion 26' of the clamp 24'. The lever 29' of clamp 24' is then actuated to urge the second inner plate 112 towards the first inner plate 110 and move the container 10' to a closed position, as shown in FIG. 6. The actuation of clamp 24' compresses the bipolar plates 80' between the seal blocks 60' to form a substantially fluid-tight seal therebetween.

Using the handle 44' disposed on the outer plates 12', 14', the container 10' including the bipolar plates 80' is lifted and disposed in the tank 41' of fluid. Thereafter the container 10' is removed from the tank 41' and the ledge 39' is seated on the lip 40' of the tank 41'. Excess fluid is caused to drain by gravity and drip from the container 10' and the bipolar plates 80' into the tank 41'. Any remaining fluid on the bipolar plates 80' is allowed to dry. It is understood that the container 10' can be disposed in additional tanks of other fluids during the dip coating process as desired. Once the fluid has dried, the clamp 24' is released. The second inner plate 112 is caused to move in an opposite direction away from the first inner plate 110, permitting the bipolar plates 80' and the seal blocks 60' to separate, and return the container 10' to the open position. The bipolar plates 80' are removed from the container 10' and the coupon 86' is removed from the arms 82'.

In another embodiment of the invention (not shown), a container includes a plurality of spaced apart seal blocks. The seal blocks are interconnected by at least one band. Each seal block includes a fastening portion and a sealing portion. The fastening portion is adapted to facilitate an interchange of the sealing portion. When the container is in an open position, an opening is formed between each of the adjacent seal blocks. The opening is adapted to receive a bipolar plate therein. The bipolar plate includes at least one coolant channel header formed therein. At least one seal formed on the bipolar plate is adapted to surround the at least one coolant channel header.

In operation, the bipolar plates are disposed in the openings of the container. Thereafter, the container is caused to move to a closed position, thereby causing the sealing portion of each of the seal blocks to contact the seal surrounding the coolant channel header of each of the bipolar plates to form a substantially fluid-tight seal therebetween.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A container comprising:
   a first plate;
   a second plate spaced from the first plate and movable in respect of the first plate; and
   at least one rail extending between the first plate and the second plate, the rail having a plurality of seal blocks disposed thereon, wherein each of the seal blocks includes at least one seal disposed thereon, and wherein the at least one seal of each of the seal blocks contacts a surface of a bipolar plate to form a fluid-tight seal therebetween.

2. The container according to claim 1, wherein the second plate is linearly movable in respect of the first plate.

3. The container according to claim 1, wherein each of the seal blocks includes a fastening portion adapted to be received on the rail and a sealing portion adapted to be removeably attached to the fastening portion.

4. The container according to claim 3, wherein the sealing portion of the seal blocks includes the at least one seal disposed thereon.

5. The container according to claim 1 wherein the seal blocks are produced from polytetrafluoroethylene.

6. The container according to claim 1, further comprising a clamp to militate against movement of the second plate relative to the first plate.

7. The container according to claim 1, further comprising a band to interconnect the first plate, the second plate, and the seal blocks.

8. The container according to claim 1, further comprising a testing coupon secured to at least one of the first plate and the second plate.

9. A container comprising:
a first outer plate;
a second outer plate spaced from the first outer plate;
at least one rail extending between the first outer plate and the second outer plate, the rail having a plurality of seal blocks disposed thereon, wherein each of the seal blocks includes at least one seal disposed thereon, and wherein the at least one seal of each of the seal blocks contacts a surface of a bipolar plate to form a fluid-tight seal therebetween;
a first inner plate disposed on the rail; and
a second inner plate spaced from the first inner plate and linearly movable in respect to the first inner plate, wherein the first inner plate and the second inner plate are disposed on the rail intermediate the first outer plate and the second outer plate, and wherein the seal blocks are disposed on the rail intermediate the first inner plate and the second inner plate.

10. The container according to claim 9, further comprising a band to interconnect the first inner plate, the second inner plate, and the seal blocks.

11. The container according to claim 9, wherein each of the seal blocks includes a fastening portion adapted to be received on the rail and a sealing portion adapted to be removeably attached to the fastening portion.

12. The container according to claim 11, wherein the sealing portion of the seal blocks includes the at least one seal disposed thereon.

13. The container according to claim 9, wherein the seal blocks are produced from polytetrafluoroethylene.

14. The container according to claim 9, further comprising a clamp to militate against movement of the second inner plate relative to the first inner plate.

15. The container according to claim 9, further comprising a testing coupon secured to at least one of the first outer plate, the second outer plate, the first inner plate, and the second inner plate.

16. A container for a dip coating process comprising:
a first plate;
a second plate spaced from the first plate and linearly movable in respect to the first plate; and
at least one rail extending between the first plate and the second plate, the rail having a plurality of seal blocks disposed thereon, wherein each of the seal blocks includes a fastening portion adapted to be received on the rail and a sealing portion adapted to be removeably attached to the fastening portion, the sealing portion including at least one seal disposed thereon, wherein the at least one seal of the sealing portion contacts a surface of a bipolar plate to form a fluid-tight seal therebetween.

17. The container according to claim 16, wherein the at least one seal of the sealing portion surrounds a channel header of the bipolar plate to form a fluid-tight seal therebetween.

18. The container according to claim 16, further comprising a testing coupon secured to at least one of the first plate and the second plate.

* * * * *